United States Patent
Chite

Patent Number: 5,899,196
Date of Patent: May 4, 1999

[54] METHOD AND APPARATUS FOR SUPPLYING WARM AIR TO AN AIR INTAKE OF AN ENGINE

[75] Inventor: Anthony M. Chite, Laytonsville, Md.

[73] Assignee: Jeffrey S. Melcher, Washington, D.C.

[21] Appl. No.: 08/994,323

[22] Filed: Dec. 19, 1997

[51] Int. Cl.[6] .................................................. F02G 5/00
[52] U.S. Cl. ............................................................ 123/556
[58] Field of Search ..................................... 123/552, 556

[56] References Cited

U.S. PATENT DOCUMENTS

| | | |
|---|---|---|
| 1,376,294 | 4/1921 | Shine . |
| 2,203,407 | 6/1940 | Donaldson . |
| 3,085,558 | 4/1963 | Sarto . |
| 3,473,522 | 10/1969 | Bailey . |
| 4,365,607 | 12/1982 | Ishikawa . |
| 4,632,084 | 12/1986 | Friksson . |
| 4,946,124 | 8/1990 | Peikert . |
| 5,046,473 | 9/1991 | Hokenson . |

FOREIGN PATENT DOCUMENTS 2 227 215 A1   7/1990   Germany .

*Primary Examiner*—Noah P. Kamen
*Attorney, Agent, or Firm*—Farkas & Manelli PLLC; Jeffrey S. Melcher

[57] ABSTRACT

Provided is a method of providing warm air to the intake of a engine of a vehicle to improve fuel economy and reduce emissions of said vehicle. The method includes the steps of:

transferring warm air directly exiting a radiator to an air intake of an engine using a variable vane which flexes and rebounds to continuously adjust an amount of warm air being supplied to said air intake in response to various engine loads;

allowing said variable vane to flex and rotate an air deflection surface of said variable vane to a position which supplies an increased volume of warm air to said air intake as a warm air load against said air deflection surface is increased; and allowing said variable vane to rebound and rotate said air deflection surface to a position which supplies a decreased volume of warm air to said air intake as a warm air load against the air deflection surface of said variable vane is decreased. The invention also provides an apparatus for practicing the method.

20 Claims, 9 Drawing Sheets

5,899,196

METHOD AND APPARATUS FOR SUPPLYING WARM AIR TO AN AIR INTAKE OF AN ENGINE

FIELD OF THE INVENTION

The present invention relates to a method for supplying warm air to the air intake of an internal combustion engine which improves fuel economy and reduces undesirable emissions. The present invention also relates to a warm air intake system which is suitable for practicing the method.

BACKGROUND OF THE INVENTION

There have been many attempts to increase the efficiency of motorized vehicles and thereby decrease the harm to the environment. One method has been to supply heated air to an intake manifold. The following patents describe the known methods for supplying heated air to the intake manifold of an engine.

U.S. Pat. No. 1,376,294 relates to an air intake system for internal combustion motors. The air intake system includes a pipe which is used to draw hot air from around the engine, in particular the exhaust manifold, and introduce the hot air into the intake manifold. If the engine gets too hot, the pipe can be turned to draw cool air from the fan until the engine is cooler. This intake system has the drawback that hot air from the exhaust manifold is too dry for efficient burning in the engine. Furthermore, this system is unable to react to different supply continuously variable amounts of warm air as the air demands of the engine vary.

U.S. Pat. No. 2,203,407 relates to an air cleaner assembly for a tractor. The air cleaner is combined with the radiator in one piece. The air flows through a conduit over the top of the radiator and into the air cleaner. The intake is shaped such that heavy dust particles pass through the radiator and not into the conduit. The air being supplied to the air intake of the engine has not passed through the radiator.

U.S. Pat. No. 3,085,558 discloses a preheater for carburetor inlet air. The preheater uses coolant from the engine. The preheater is used during the engine warm up cycle to prevent icing.

U.S. Pat. No. 3,473,522 discloses a mechanism for heating air using the exhaust manifold of an engine and the hot coolant.

U.S. Pat. No. 4,365,607 discloses a hot-air intake system of an internal combustion engine. The hot-air intake system uses air heated by the exhaust manifold.

U.S. Pat. No. 4,362,084 relates to a valve for apportioning preheated air and non-preheated air to an internal combustion engine. The valve is operated by a thermostat.

U.S. Pat. No. 4,946,124 discloses a clamp used to transfer hot air from the exhaust manifold to the intake manifold.

U.S. Pat. No. 5,046,473 discloses an automatic air intake temperature regulator apparatus and method. A shutter is opened and closed based on the temperature of the air entering the air intake.

It has now been found that the fuel efficiency of an engine is not only affected by the temperature of the air entering the intake manifold, but also by the amount of moisture in the air. It has also been found that air heated by the exhaust air manifold of an engine is usually too hot and dry, and therefore the efficiency of the engine is decreased. Thus, in general air heated by the exhaust manifold has the wrong concentration of gasses, such oxygen and water vapor, for efficient combustion.

The above mechanisms for supplying heated air to the air intake are complicated and expensive. Furthermore, conventional mechanisms do not continuously adjust the amount of heated air based on the air requirements of the engine as the motorized vehicle is operated.

There is a need for an uncomplicated and economical apparatus which is capable of supplying warm air having adequate moisture to the intake manifold of an engine. There is also a need for an apparatus which is capable of continuously adjusting the amount of warm air supplied to the engine based on the air requirements of the engine as the vehicle is being operated.

SUMMARY OF THE INVENTION

It is an objective of the present invention to provide a novel economical and uncomplicated method and apparatus for supplying warm air having adequate moisture to the intake manifold of an engine in a manner which increases fuel economy and reduces emissions.

Another objective of the present invention is to provide a novel method and apparatus which is capable of continuously adjusting the amount of warm air supplied to the engine based on the air requirements of the engine as the vehicle is being operated, on a substantially instantaneous basis.

The above objectives and other objectives can be obtained by the following. The present invention provides a novel method of supplying warm air to the intake of a engine of a vehicle to improve fuel economy and lower emissions of the engine. The method comprises the steps of:

transferring warm air directly exiting a radiator or cooling fin to an air intake of an engine using a variable vane which flexes and rebounds to continuously adjust an amount of warm air being supplied to the air intake in response to various engine loads;

allowing said variable vane to flex which rotates an air deflection surface of the variable vane in relation to a fixed mount to a position which supplies an increased volume of warm air to the air intake as a warm air load against the air deflection surface is increased; and allowing the variable vane to rebound which rotates the air deflection surface to a position which supplies a decreased volume of warm air to the air intake as a warm air load against the air deflection surface of the variable vane is decreased.

The present invention also provides a novel warm air intake system for a vehicle comprising a radiator cooling system and an engine having an air intake. The warm air intake system comprises:

a variable vane having a warm air deflection surface, a flexible material for adjusting the position of the warm air deflection surface in response to a warm air load contacting the warm air deflection surface, and a mount for mounting the variable vane. The flexible material binds the warm air deflection surface to the mount. The variable vane provides a predetermined degree of rotation of the warm air deflection surface in response to a warm air load applied to the warm air deflection surface. A stiffness of the flexible material, a thickness of the flexible material and a size of the warm air deflection surface being selected to provide the predetermined degree of rotation in relation to the fixed mount.

DETAILED DESCRIPTION OF PREFERRED EMBODIMENTS

The present invention can be used on any type of internal combustion engine to provide improved fuel economy and reduced emissions. The present invention is particularly suitable for use in motorized vehicles to provide improved fuel economy and reduced emissions. Examples of suitable motorized vehicles include gas and diesel automobiles, buses, trucks, vans, motorhomes, and the like which contain a gas or diesel engine that is liquid-cooled using a radiator to provide a source of warm air. The invention can also be utilized in an air-cooled vehicle such as an airplane, if the air being heated by cooling fins on the engine cylinder walls is not superheated. The source of warm air should heat the air to about 120 to about 200° F., preferably from about 120 to about 180° F., more preferably from about 120 to about 160° F., and most preferably from about 120 to about 140° F. Thus, the warm air should not be heated by the exhaust manifold of an engine in automobile, which can heat the air passing over the exhaust manifold to temperatures significantly greater than 200° F.

Figure 1:
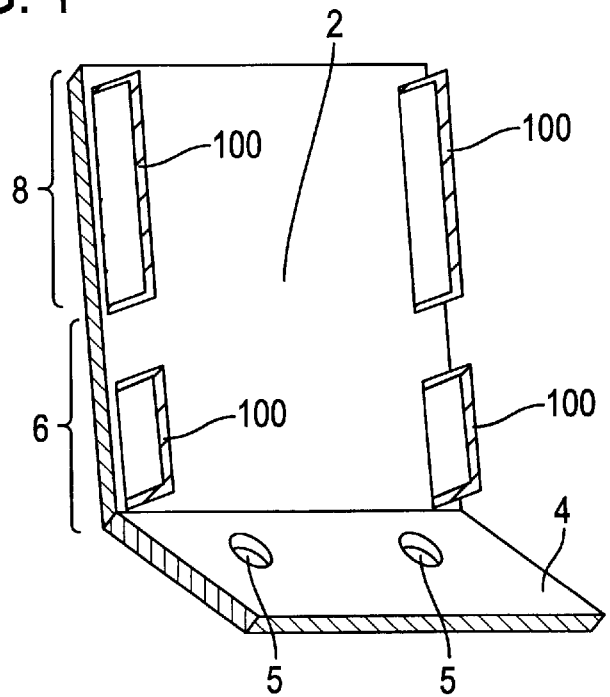
FIG. 1 illustrates a view of a variable vane according to the present invention.
Figure 2:
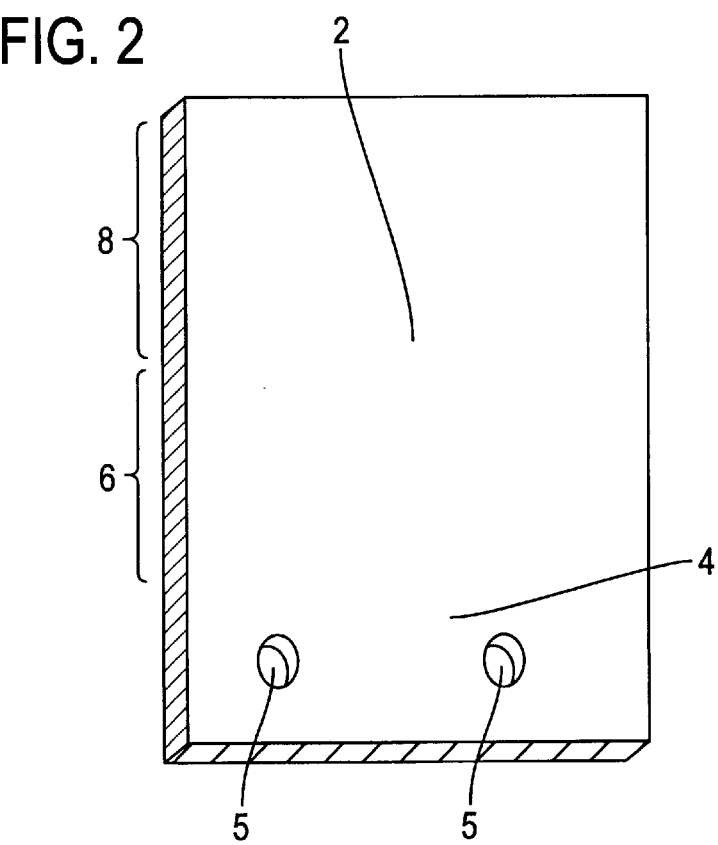
FIG. 2 illustrates a view of a variable vane according to the present invention.
Figure 3:
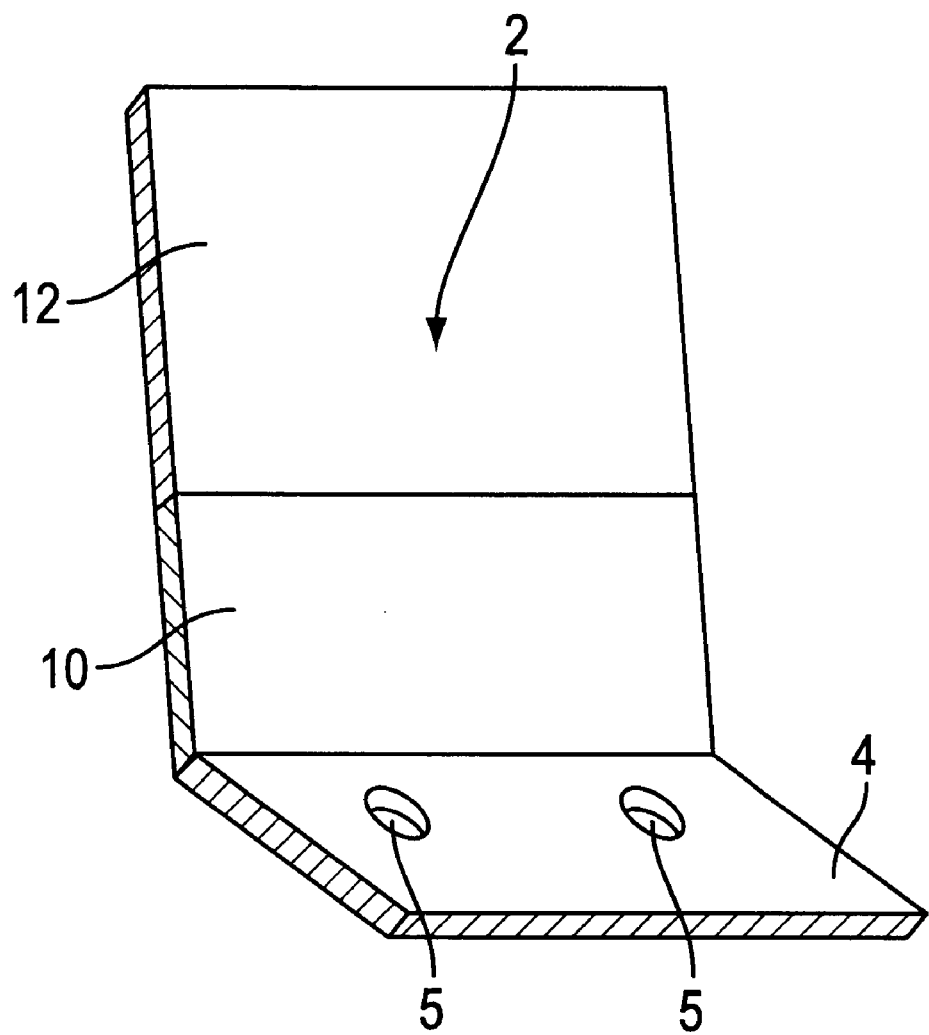
FIG. 3 illustrates a view of a variable vane according to the present invention.

As shown in FIGS. 1 through 3, the variable vane has a warm air deflection surface 2, and a vane mount 4. The vane mount includes bolt or screw holes shown at 5. While bolts or screws are the preferred method for mounting the variable vane, other methods can be utilized, such as adhesives and clips. The warm air deflection surface should be substantially flat in the section that flexes under an air pressure load, as shown generally at 6. Preferably, the warm air deflection surface is substantially flat. However, the portion of the warm air deflection surface that does not generally flex a substantial amount during use, shown at 8, can have a convex curved surface or channels to direct the warm air to a warm air conduit or a warm air opening on the air intake of an engine. The preferred flat warm air deflection surface is shown in the FIGS. 1 through 3.

The air deflection surface preferably includes air guides, shown at 100. The air guides should be constructed and arranged so as to not substantially impede the flexion and rotation of the variable vane. The air guides can have slits or gaps to allow the air deflection surface to rotate. More than one guide can be utilized, as shown in FIG. 1, to prevent flexion of the variable vane from being impeded.

While not preferred, as shown in the FIG. 3, the variable vane can include a flexible material shown at 10, bound to a non-flexible material, shown at 12. The non-flexible material can be any material capable of substantially retaining its shape over the operating temperature of the motorized vehicle. For example, when utilized in an automobile, the non-flexible material should retain its shape over a temperature range of from about −80° F. to about 280° F. Non-flexible is understood herein to mean having a flexibility less than the flexibility required to change the position of the warm air deflection surface the amount necessary to provide the amount of warm air required by the engine under the operating conditions of the motorized vehicle.

The variable vane can be formed from any material which has the functional capability of flexing under a load and returning to substantially its original position. Examples of suitable flexible materials include but are not limited to: composites, laminates, metals, plastics, and combinations thereof. Preferably, the vane is comprised of plastic.

The material should have a temperature resistance suitable for use in ambient air and the operating conditions of the motorized vehicle. If the variable vane is to be used in an automobile, the material selected should be capable of providing flexible characteristics described herein over temperatures of from about −80° F. to about 280° F.

The material and shape of the vane selected will depend upon the type of motorized vehicle the vane to be installed in and the warm air load being applied to the variable vane. The warm air load is the warm air pressure asserted against the vane. In an automobile, the warm air load is usually provided by warm air driven against the variable vane by the engine fan or by warm air passing through the radiator under driving conditions. In general, the greater the speed of the automobile, the greater the warm air load against the variable vane. The warm air load can also be provided in part by a negative air pressure caused by the engine sucking air into the air intake. The warm air supply is preferably taken from the upper third of the radiator.

If the variable vane is used in an airplane, the warm air load can be provided by the props or air passing through the engine while flying. The warm air in airplane can be heated by utilizing the cooling fins on the engine cylinder walls. Because the air is passing over the cooling fins at such a high rate during flying, the air will usually not be heated to a temperature greater than about 200° F. Furthermore, radial air cooled engines, such as those used in airplanes, operate with a maximum internal cylinder head temperature of about 300° F. Thus, the temperature will be significantly lower farther down the cylinder walls and at the external surface where the cooling fins are located.

The variable vane shape and material should be selected such that the variable vane flexes open under an increased warm air load to provide an increased amount of warm air to the air intake of the engine and the variable vane rebounds towards its original position when the warm air load is reduced to thereby reduce the amount of warm air supplied to the air intake of an engine. In this manner, the amount of warm air being supplied to the air intake of an engine can be maintained at substantially an optimal amount for enhanced fuel economy and reduced emissions during normal driving conditions. Furthermore, the use of the variable vane can make the ratio of warm air to ambient air being supplied to the engine air intake within a significantly narrower range over the RPM (revolutions per minute) operating range of the engine, compared with a fixed conventional opening. Conventional heated air mechanisms can only provide the optimal amount of heated air to the engine at one engine operating speed or load. Furthermore, in conventional heated air mechanisms, the ratio of heated air to ambient air being supplied to the air intake varies significantly over the RPM operating rang of the engine. During routine driving, the automobile is continually revving up and down as the automobile slows and accelerates. The variable vane is capable of providing a significant improvement in fuel economy and reduction in emissions over a wide range of engine speeds and loads compared to conventional mechanisms for providing heated air to the air intake of an engine.

The degree of flexibility can easily be adjusted to the required amount by varying the thickness of the flexible material and/or the size the warm air deflection surface. In general, the greater the size the warm air deflection surface, the greater the warm air load applied to the flexible material. The greater the thickness the flexible material, the stiffer or more resistant to flexing the variable vane will be. Thus, by adjusting the size of the warm air deflection surface and the thickness of the flexible material, any desired degree of flexibility can be obtained. Based on the disclosure provided herein, one skilled in the art will easily be able to provide a variable vane having a shape and thickness which will provide the desired degree of flexibility under the warm air load applied to the variable vane. In an automobile, suitable amounts of flex have been found to be the amount of flex which allows the warm air deflection surface to rotate open about 10 to about 45 degrees, preferably about 20 to about 35 degrees, measured from the unflexed position of the warm air deflection surface to a rotated fully flexed position under the maximum warm air load applied.

As the air temperature increases, the quantity of oxygen per set volume of air decreases. Thus, as the ambient air temperature increases, more air flow is necessary to provide the required level of precombustion gasses to the engine. A variable vane material can be utilized which provides an increased degree of flexibility as the ambient temperature increases. In this manner, the variable vane will exhibit increased flex in warmer weather, thus providing increased warm air flow in warmer weather. Conversely, in colder weather the variable vane will exhibit reduced flex, providing a reduced warm air flow to the engine. An example of a suitable material that provides enhanced degrees of flex as the temperature increases is plastic materials that are capable of exhibiting flexible characteristics over a temperature range of from about −80° F. to about 280° F. Examples of suitable plastic materials include, but are not limited to, hydrocarbon resins, ABS resins, aramid resins, polyacrylic acid resins, and polycarbonate resins. Preferred plastic materials are acrylic resins and polycarbonate resins. A particularly preferred acrylic resin is Lucite and a particularly preferred polycarbonate is Lexan. The plastic material can be in the form of a solid plastic, a laminate or a composite. Examples of composites include plastic materials containing fibers or other strengthening materials. Plastic is also a preferred material because it can be easily molded or formed into the desired shape.

Figure 4:
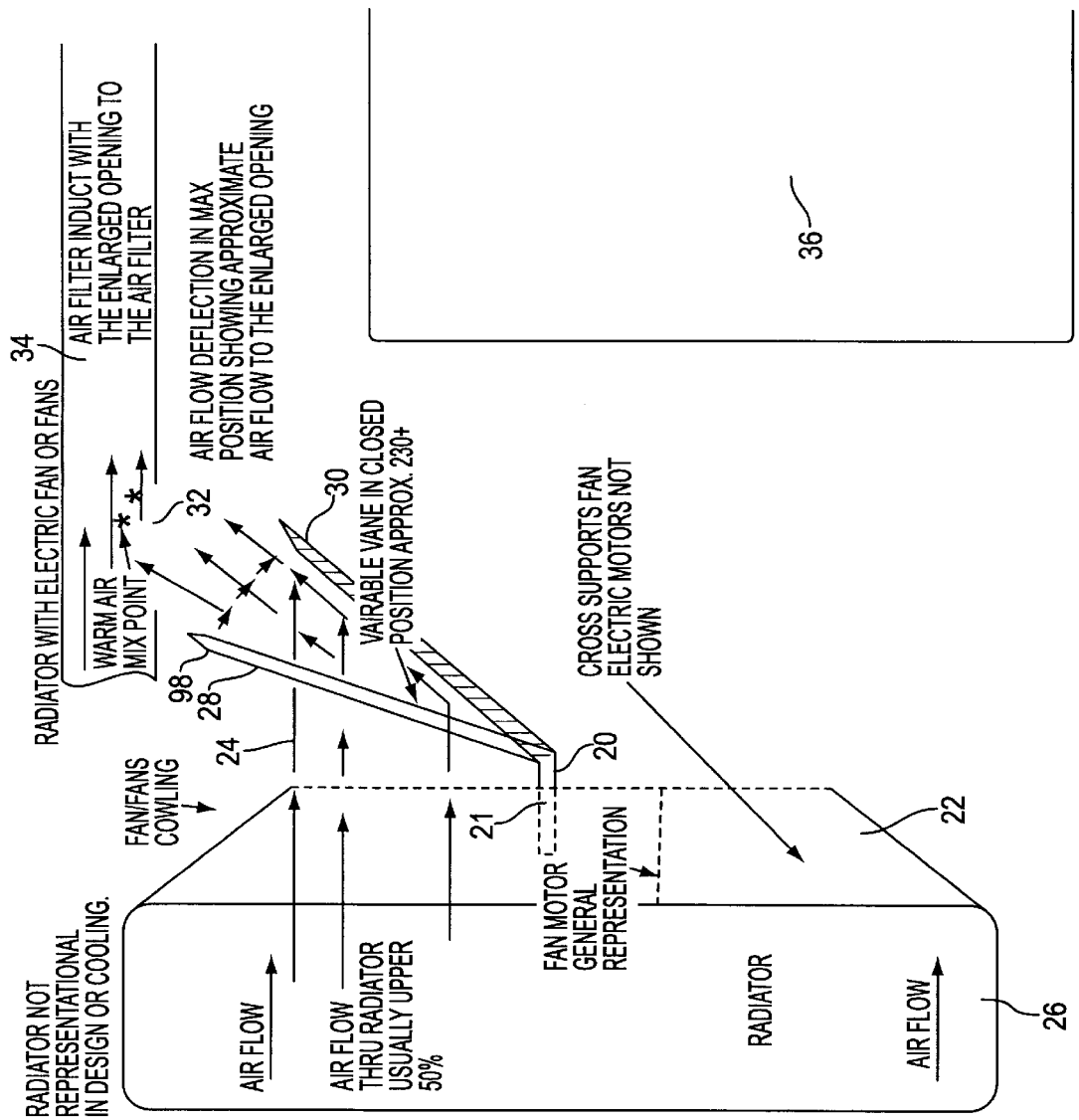
FIG. 4 illustrates a view of a variable vane mounted in a vehicle.
Figure 5:
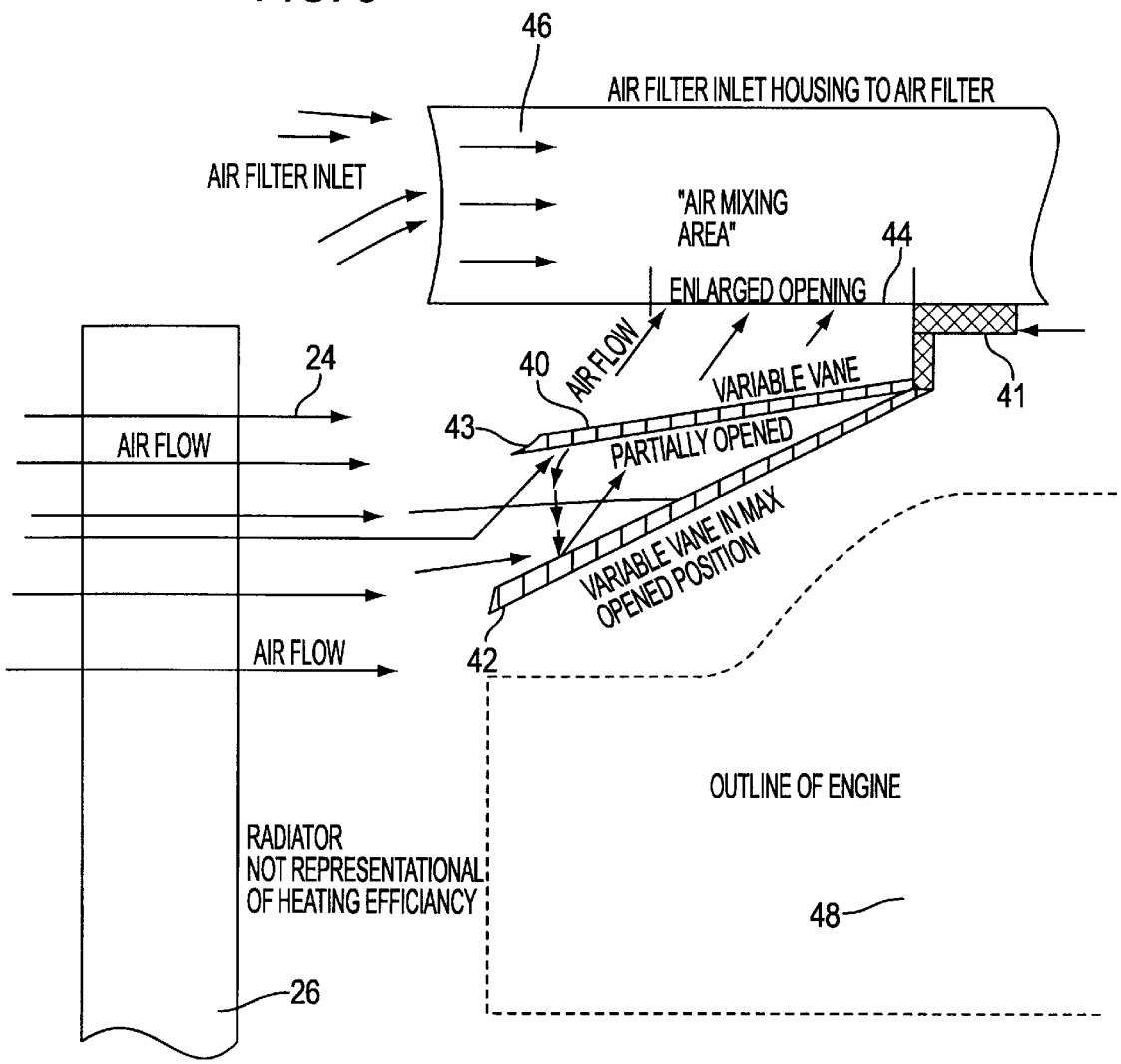
FIG. 5 illustrates a view of a variable vane mounted in a vehicle.
Figure 6:
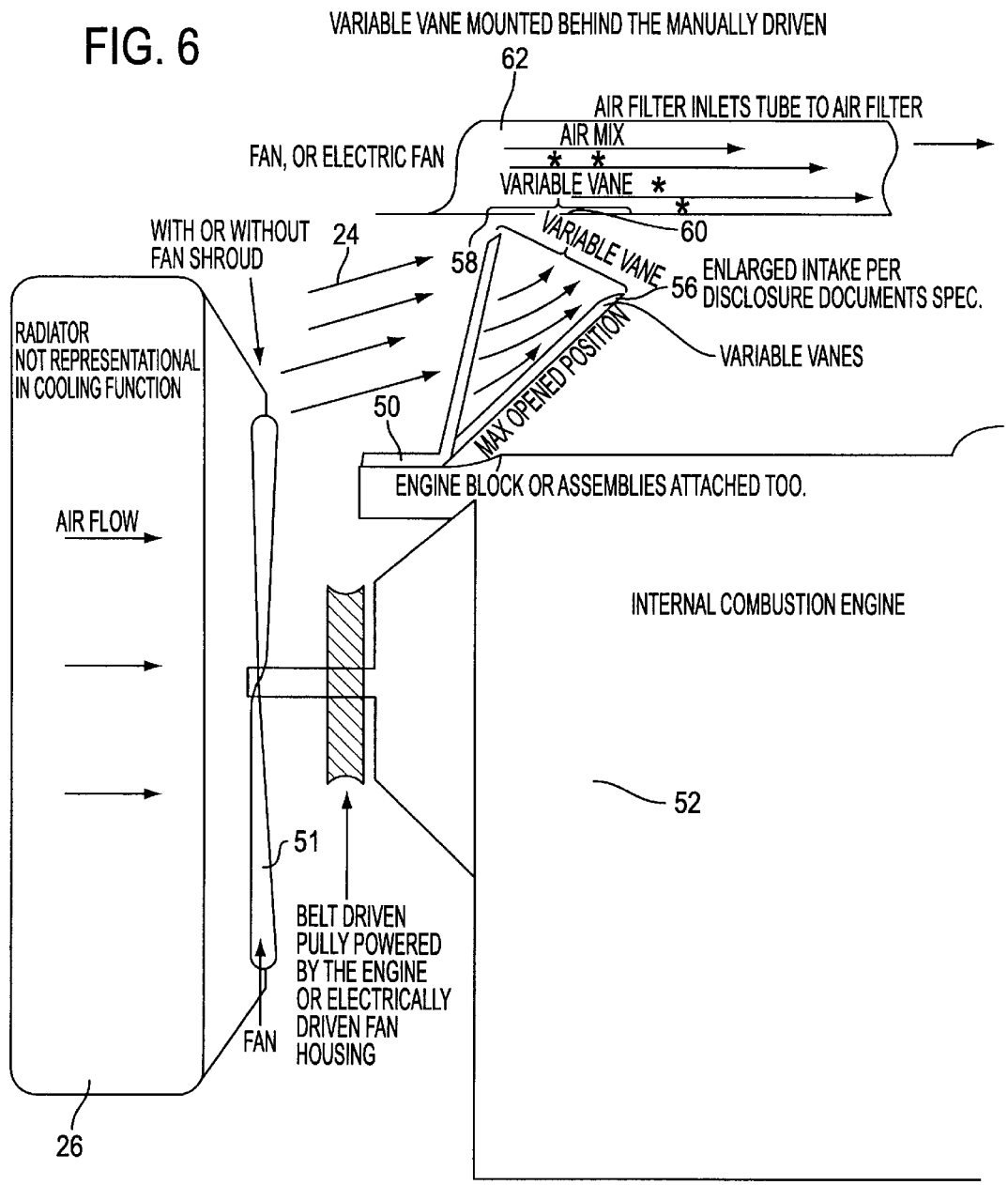
FIG. 6 illustrates a view of a variable vane mounted in a vehicle.

The variable vane can be mounted as shown in FIGS. 4 through 6. As shown in FIG. 4, the variable vane 20 is mounted on the radiator shroud 22. Warm air, shown at 24, is warmed as it passes through the radiator 26 and then strikes the warm air deflection surface 28 of the variable vane 20. As the warm air load 24 is increased, either by the fan or increased speed of the vehicle, the variable vane material flexes under the load and the warm air deflection surface 28 rotates to a more open position, shown at 30. As the warm air deflection surface 28 rotates open, more warm is deflected into the warm air opening 32 of the air intake tube 34. The air intake tube 34 supplies air to the engine 36. Conversely, as the warm air load 24 is decreased, the warm air deflection surface 28 rotates back towards its original position, shown at 38, which reduces the amount of warm air being deflected into the warm air opening 32. In this manner, the amount of warm air being deflected into the air intake tube 34 is continuously adjusted as air requirements of the engine decrease and increase. As the engine requires more air during acceleration, the fan (not shown) rotates faster, which increases the warm air load 24. Similarly, as the engine requires more air during higher speed travel, more air passes through the radiator 26, which increases the warm air load 24. As the warm air load 24 is increased, the variable vane opens to provide an increased amount of warm air to the air intake of the engine. FIG. 4 shows the initial position of the warm air deflection surface 28 as being about 23° in comparison to the flexible fan mount shown at 21. This initial position will vary depending upon the location of the variable vane mount 21 and the location of the warm air opening 32. One skilled in the art will easily be able to determine the initial position of the warm air deflection surface 28 to supply the desired amount of warm air to the engine at the lowest warm air load level. In general, the initial position of the warm air deflection surface 28 is selected so that an initial quantity of warm air is being supplied to the warm air opening 32, even at the lowest warm air load level.

As shown in FIG. 5, the variable vane 41 can be mounted on the air intake tube 46. Warm air, shown at 24, is warmed as it passes through the radiator 26 and then strikes the warm air deflection surface 40 of the variable vane 41. As the warm air load 24 is increased, either by the fan (not shown) or increased speed of the vehicle, the variable vane flexes under the load and the warm air deflection surface 40 rotates to a more open position, shown at 42. As the warm air deflection surface 40 rotates open, more warm air is deflected into the warm air opening 44 of the air intake tube 46. The air intake tube 46 supplies air to the engine 48. Conversely, as the warm air load 24 is decreased, the warm air deflection surface 40 rotates back towards its original position, shown at 43, which reduces the amount of warm air being deflected into the warm air opening 44. In this manner, the amount of warm air being deflected into the air intake tube 44 is continuously adjusted as air requirements of the engine decrease and increase. As the engine requires more air during acceleration, the fan (not shown) rotates faster, which increases the warm air load 24. Similarly, as the engine requires more air during higher speed travel, more air passes through the radiator 26, which increases the warm air load 24.

FIG. 6 shows the variable vane 50 mounted on the engine 52. Warm air, shown at 24, is warmed as it passes through the radiator 26 and then strikes the warm air deflection surface 54 of the variable vane 50. As the warm air load 24 is increased, either by the fan 51 or increased speed of the vehicle, the variable vane flexes under the load and the warm air deflection surface 54 rotates to a more open position, shown at 56. As the warm air deflection surface 54 rotates open, more warm is deflected into the warm air opening 60 of the air intake tube 62. The air intake tube 62 supplies air to the engine 52. Conversely, as the warm air load 24 is decreased, the warm air deflection surface 54 rotates back towards its original position, shown at 58, which reduces the amount of warm air being deflected into the warm air opening 60. In this manner, the amount of warm air being deflected into the air intake tube 62 is continuously adjusted as air requirements of the engine decrease and increase. As the engine requires more air during acceleration, the fan 51 rotates faster, which increases the warm air load 24.

Similarly, as the engine requires more air during higher speed travel, more air passes through the radiator 26, which increases the warm air load 24.

Figure 7:
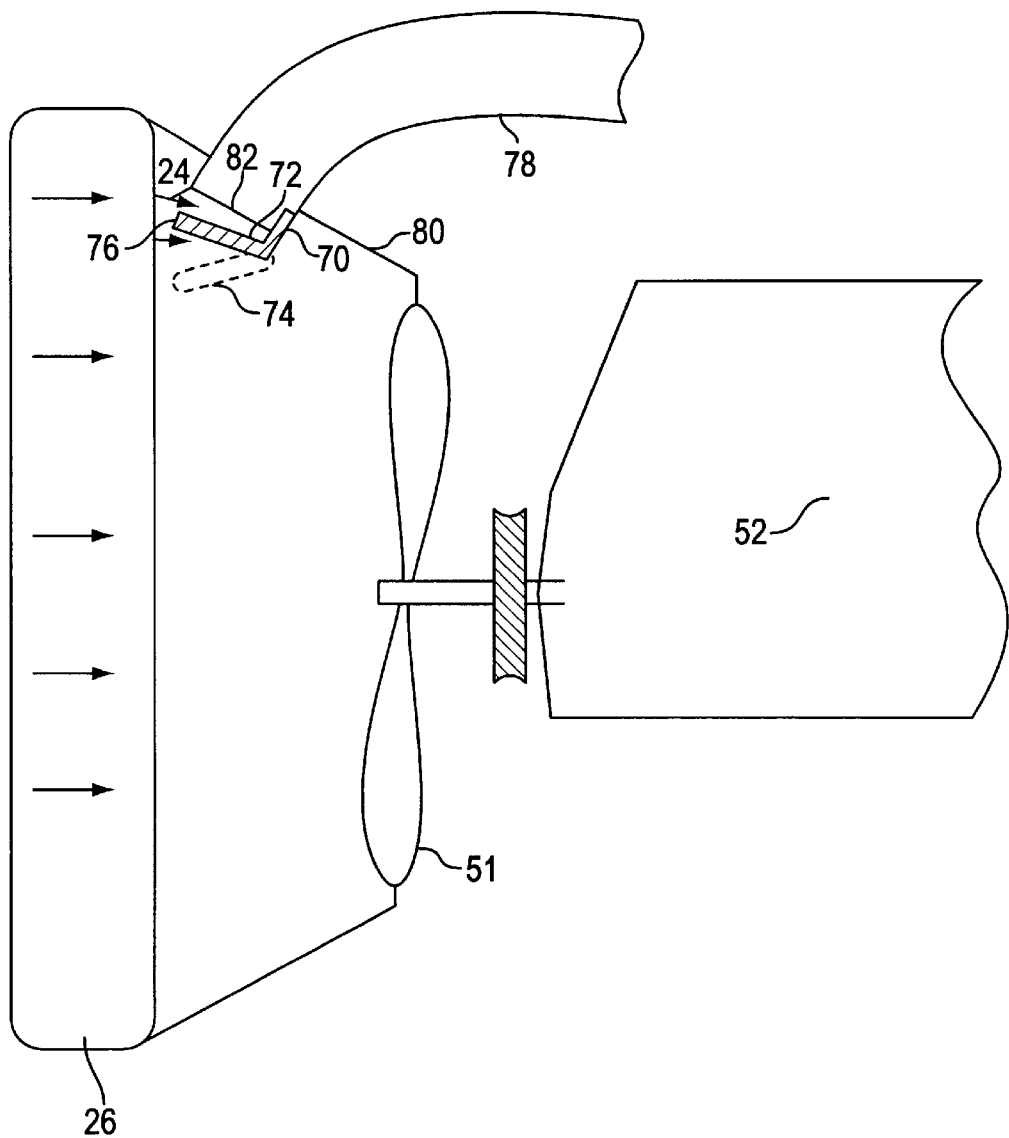
FIG. 7 illustrates a view of a variable vane and a warm air conduit.
Figure 8:
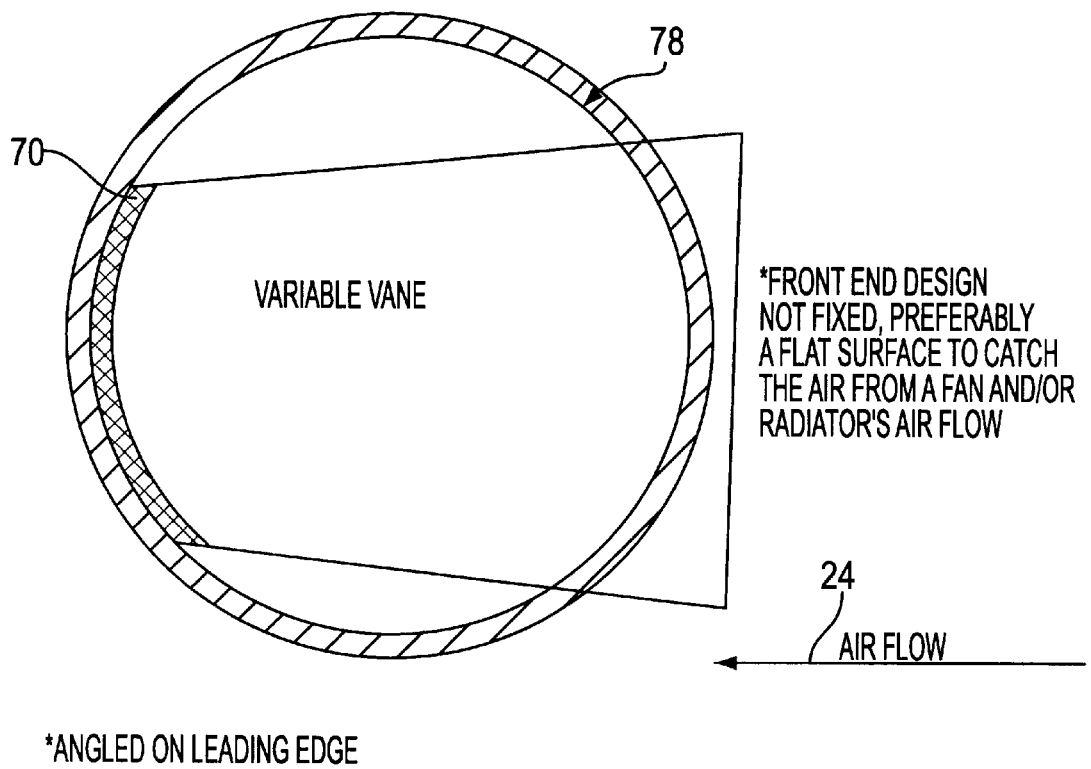
FIG. 8 illustrates a view of a variable vane and a warm air conduit.

Depending on the location of the air intake system, a warm air conduit may be required, as shown in FIGS. 7 and 8. FIGS. 7 and 8 show two views of a variable vane 70 mounted to a warm air conduit 78. Warm air, shown at 24, is warmed as it passes through the radiator (not shown) and then strikes the warm air deflection surface 72 of the variable vane 70. As the warm air load 24 is increased, either by the fan (not shown) or increased speed of the vehicle, the variable vane flexes under the load and the warm air deflection surface 72 rotates to a more open position, shown at 74. As the warm air deflection surface 74 rotates open, more warm is deflected into the warm air conduit opening 82 of the warm air conduit 78. The warm air conduit 78 supplies warm air to the engine air intake (not shown). Conversely, as the warm air load 24 is decreased, the warm air deflection surface 72 rotates back towards its original position, shown at 76, which reduces the amount of warm air being deflected into the warm air conduit opening 82. In this manner, the amount of warm air being deflected into the warm air conduit 78, and being supplied to the engine air intake, is continuously adjusted as air requirements of the engine decrease and increase. As the engine requires more air during acceleration, the fan rotates faster, which increases the warm air load 24. Similarly, as the engine requires more air during higher speed travel, more air passes through the radiator, which increases the warm air load 24.

Figure 9:
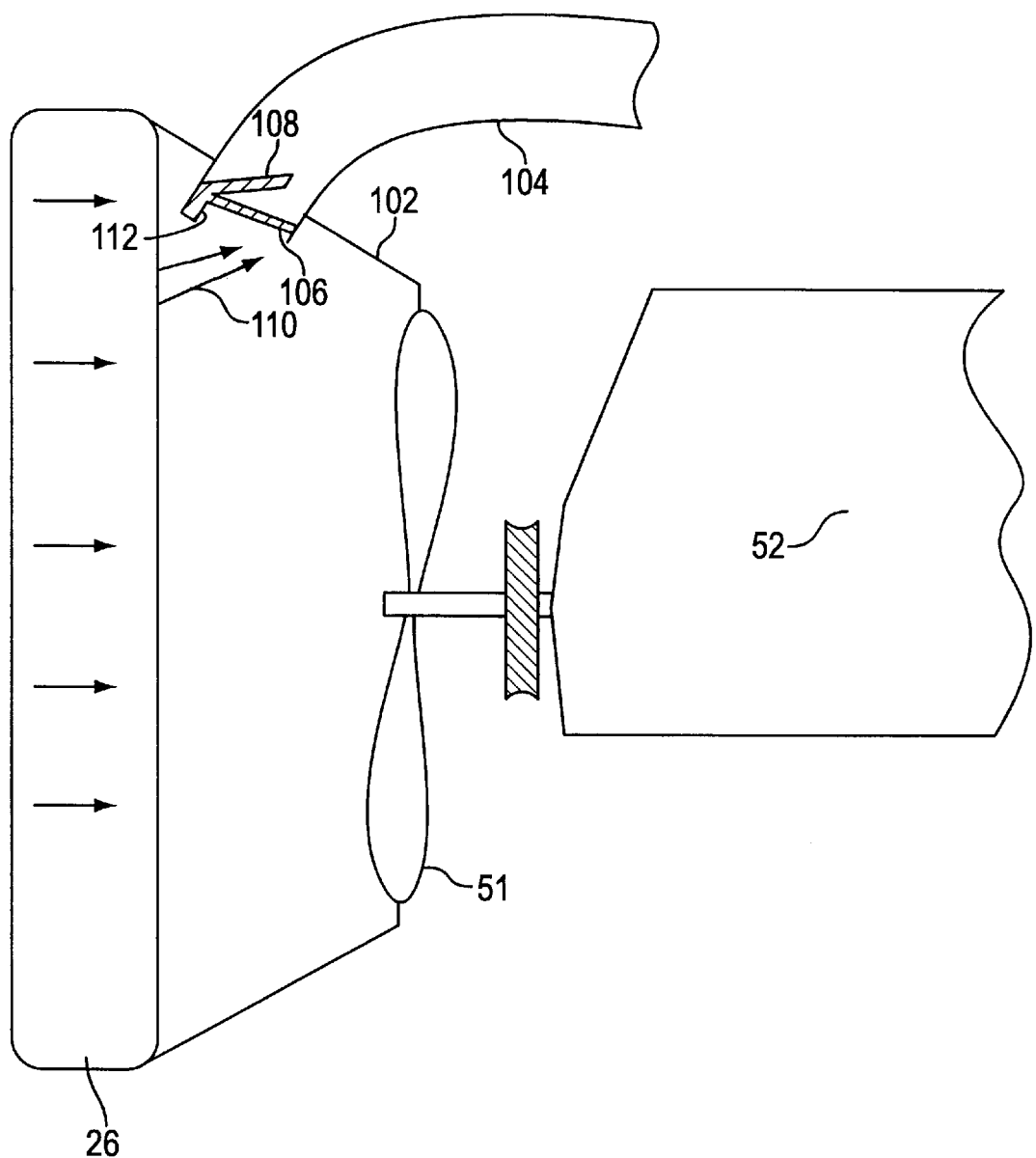
FIG. 9 illustrates a view of a variable vane mounted in a vehicle.

FIG. 9 illustrates a variable vane 106 mounted internally mounted in a warm air conduit 104 by the variable vane 112. In this example, the warm air conduit is connected to the radiator fan shroud 102. The warm air conduit is constructed and arranged such that warm air load from the radiator, shown at 110, flows towards the air flow deflection surface of the variable vane 112. As the warm air load 110 is increased, either by the fan (not shown) or increased speed of the vehicle, the variable vane flexes under the load and the warm air deflection surface rotates to a more open position, shown at 108. As the warm air deflection surface rotates open, more warm is allowed into the warm air conduit. The warm air conduit 104 supplies warm air to the engine air intake (not shown). Conversely, as the warm air load 110 is decreased, the warm air deflection surface rotates back towards its original position, shown at 106, which reduces the amount of warm air being allowed into the warm air conduit. In this manner, the amount of warm air being allowed into the warm air conduit 104, and being supplied to the engine air intake, is continuously adjusted as air requirements of the engine decrease and increase. As the engine requires more air during acceleration, the fan rotates faster, which increases the warm air load 110. Similarly, as the engine requires more air during higher speed travel, more air passes through the radiator, which increases the warm air load 110.

As shown in FIG. 9, when the variable vane is internal to the warm air conduit a larger warm air conduit may be necessary because the variable vane may not open completely. For example, if the maximum rotated open position of the variable vane is about 60°' (where 90° is the theoretical maximum opening), then the cross-sectional area of the warm air conduit should be about 30% greater to account for the decreased warm air flow caused by the variable vane not opening to the theoretical maximum of 90°.

The warm air from the variable vane is usually supplied to the air intake upstream of the air filter, such that the warm air travels through the air filter before entering the engine. It has been found that for optimal fuel economy from the variable vane, the warm air opening into the air intake tube for supplying air to the air filter should be sized to provide the optimum fuel economy. The size of the opening will depend upon the amount of warm air being forced into the warm air opening by the variable vane.

In general, the warm air opening should be such that the amount of warm air being supplied to the air intake is about 10 to about 40%, preferably about 20 to about 35%, of the total volume of air being supplied to the air intake. When a warm air conduit are utilized, suitable warm air openings have been found such that the sum of the cross-sectional area of the air intake tube and the cross-sectional area of the warm air opening is about 120 to about 180%, preferably from about 130 to about 150%, of the cross-sectional area of the air intake on the engine. When no warm air conduits are utilized, suitable warm air openings have been found such that the sum of the cross-sectional area of the air intake tube and the cross-sectional area of the warm air opening is about 120 to about 200%, preferably from about 130 to about 160%, of the cross-sectional area of the air intake on the engine The term "cross-sectional area" refers to the area in a plane which is substantially perpendicular to the direction of the air flow. For example, the cross-sectional area of a substantially round tube or round warm air opening is equal to pi times the square of the radius of the inside diameter of the tube or warm air opening. One skilled in the art will be able to easily determine the cross-sectional area of tubes and openings which are not substantially round using conventional mathematical formulae.

For an engine having a fuel injected throttle body or carburetor, the cross-sectional area of the air intake can be measured using the inside diameter the of throttle body or carburetor. If the inside diameter of the throttle body or carburetor is substantially round, the cross-sectional area of the air intake is equal to pi times the square of the inside diameter. If more than one air passage is present in the throttle body or carburetor, the cross-sectional area of the air intake is the cross-sectional area of the sum of all air passages through the throttle body or carburetor which supply air to the engine for combustion.

On automobiles, busses and trucks, the air intake tube usually has a cross-sectional area which is substantially equal to the cross-sectional area of the air intake on the engine. In such a case, suitable cross-sectional areas of the warm air intake are from about 20 to about 30% of that of the air intake tube.

In the winter months when the temperatures fall below about 40° F. and the engine receives cold air from outside of the engine compartment, approximately about 10 to about 30% of the air intake from the outside of the engine compartment may have to be closed off to prevent a ram effect as the vehicle is driven. The reduced cold air flow can be compensated by enlarging cross-sectional area of the warm air intake by an extra 5 to about 15%.

For example, if the throttle body has an inside diameter of 4 inches and the air intake tube has an inside diameter of 4 inches, suitable warm air openings are from about 0.6 inches to about 1.2 inches in diameter. When the air intake tube is partially closed such as during winter months, suitable cross-sectional area of the warm air opening are from about 25 to about 45% of the cross-sectional area of the air intake tube.

The air intake tubes on automobile engines are often restrictive because of air intake tubes can be flattened out to pass over the radiator, or the air intake tubes can have many bends, both of which can significantly restrict air flow. In such a case, the cross-sectional area of the warm air opening can be larger, such as from about 20 to about 45% of the cross-sectional area of the air intake tube.

When using a warm air conduit for transferring warm air from the variable vane to the air intake tube, the cross-sectional area of the warm air conduit should be at least equal to the cross-sectional area of the warm air opening. The warm air conduit should connect with the air intake tube as close to the air filter as possible, such that the warm air must pass through the air filter before entering the engine. Alternatively, the warm air conduit can be connected directly to the air filter housing. While not desired, if a separate air filter is used for the warm air, the warm air intake can pass the filtered warm air directly to the engine air intake instead of passing the warm air through the ambient air filter.

The warm air conduit should be of a material which is sufficiently flexible to allow for engine vibrations and movements during operation. When used in automobiles, the warm air conduit should meet federal specifications on fire retardency required for safety. With new age flexible materials, such as plastics and aluminum alloys, the federal specifications are easily met. If the air conduit is ribbed, the ribs should be external to avoid turbulence caused by the ribs, which can reduce the warm air flow.

The warm air conduit can be connected to the air intake using adhesives or fasteners. Examples of suitable fasteners include, but are not limited to, clamps, clips, rivets, screws, and ties.

The warm air conduit preferably is formed from a material with does not easily conduct or absorb heat from the engine. Examples of such materials includes plastics and composites.

The present invention is capable of improving the fuel economy by about 10% or greater. The present invention is also capable of significantly reducing undesirable emission.

EXAMPLE 1

The variable vane was tested on a 1989 Chevrolet Blazer, having a V6 engine. After installation of a variable vane according to the present invention, the Blazer exhibited an average increase in gas mileage of greater than 2 miles per gallon. A tail pipe emissions tester revealed a significant reduction in undesirable emissions after application of the variable vane.

Figure 10:
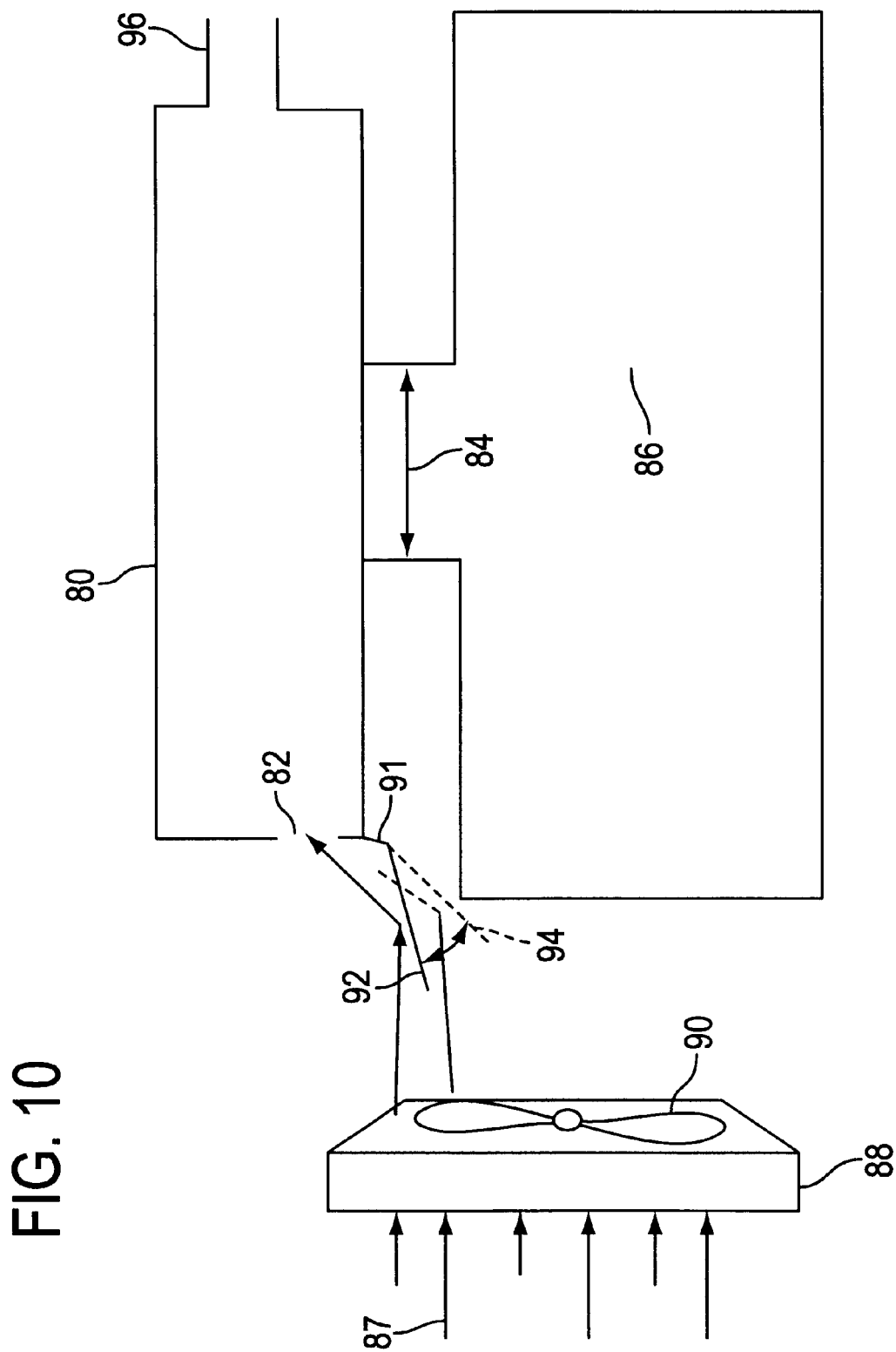
FIG. 10 illustrates a view of a variable vane mounted in a vehicle.

FIG. 10 illustrates how the variable vane was mounted in the Blazer. The variable vane 91 was mounted directly to the air filter casing 80. The air intake of the engine 86 had an inner diameter of five inches, shown at 84. A warm air opening 82 was formed in the air filter casing 80 by drilling two holes, each having a diameter of two and one quarter inch in diameter. There were no other alterations to the vehicle engine and a tune-up was not performed.

Air 87 being drawn through the radiator 88 by the fan 90 strikes the warm air deflection surface of the variable vane. At no warm air load, the warm air deflection surface was at about 21° shown at 92, which was measured from the direction of the warm air flow. At maximum engine RPM, the warm air load flexed the variable vane and rotated the warm air deflection surface to a position of about 39°, shown at 94.

The air intake tube 96 had a cross-sectional area of about 10 square inches. About ⅓ of the opening into the air intake tube was blocked using an insert, such as plastic, and tape or other type of fastener to hold the insert in place.

The warm air deflection surface was about 6 inches wide by 6 inches long. The long direction was measured from the variable vane mount to the tip of the variable vane. The thickness was about 5/16 of an inch, with a tapered end. The variable vane was formed from commercially available acrylic plastic.

EXAMPLE 2

An external variable vane was tested on a Pusher Type Diesel public transportation bus weighing 32,000 lbs. The bus engine was a 6 cylinder, turbo charged caterpillar diesel engine. The bus thermostat temperature was set to the factory specifications of 180° F. The air intake tube had an internal diameter of 8 ⅞ inches.

While one warm air conduit is preferred, two tubes, each having an inner diameter of 1.5 inches, were used as a warm air conduit to channel the warm air from the variable vane to the air intake on the diesel engine. The warm air conduit had a length of about 5 feet. Two variable vanes were utilized. Each variable vane and warm air conduit were mounted as shown in FIG. 7. The air deflection surface was about 2.5 inches in length, and about 2 inches in width at the end farthest from the mount, which tapered down to about 1.25 inches where the air deflection surface met the mount, as shown in FIG. 8.

The performance of the variable vane was tested by an independent laboratory, Alban Engine Power Systems, Baltimore, Md., using Superflow SF-601 Dyno Test Software. The test results are shown in the following Table 1.

For a large diesel bus, if the air intake is external to the engine compartment, such as in from the radiator, it may be necessary to block a portion of the opening in very cold winter weather, such as up to about 30%. This is a common practice for conventional large diesel engines.

In hot summer months, for example in temperatures above about 90° F., it may be necessary to decrease the amount of warm air supplied to the diesel engine.

TABLE 1

| Engine RPM* | Fuel Economy With Variable Vane (Miles/Gallon) | Fuel Economy Without Variable Vane (Miles/Gallon) | Fuel Volume, With Variable Vane (Gallons/Hour) | Fuel Volume Without Variable Vane (Gallons/Hour) |
|---|---|---|---|---|
| 2600 | 4.99 | 4.88 | 11.9 | 12.4 |
| 2500 | 4.79 | 4.68 | 11.9 | 12.4 |
| 2400 | 4.63 | 4.47 | 11.9 | 12.5 |
| 2300 | 4.30 | 4.64 | 11.4 | 11.5 |
| 2200 | 4.50 | 4.49 | 11.1 | 11.4 |
| 2100 | 4.43 | 4.4  | 10.8 | 11.0 |
| 2000 | 4.34 | 4.38 | 10.5 | 10.5 |

*Engine revolutions per minute rounded off to the nearest 100 RPM.
The fuel volume is a measurement of the fuel volume through the engine system. In general, when economy is desired, a lower value is bettered.

The test results in Table 1 demonstrate that the variable vane resulted in a significant reduction in fuel volume in gallons per hour, as well as an increase in fuel economy. Since the diesel engines were turbo charged, it is believed that when waste gate of the turbo charger opens, the fuel economy temporarily drops. Therefore, with more air flow being supplied to the turbo charger using the variable vane, the waste gate opens at a lower RPM (2300), compared to when no variable vane is use (2400). Thus, the data in Table 1 reflects a temporary drop in fuel economy at 2300 when using the variable vane and a temporary drop in fuel economy at 2400 when no variable vane is present. However, as can be seen from the fuel volume utilized, the use of a variable vane reduced fuel consumption over the entire RPM range compared to a conventional turbo charged diesel engine.

While the invention has been described in detail and with reference to specific embodiments thereof, it will be apparent to those of ordinary skill in the art that various changes and modifications can be made to the claimed invention without departing from the spirit and scope thereof.

I claim:

1. A method of providing warm air to the intake of a engine of a vehicle to improve fuel economy of said vehicle, the method comprising the steps of:

transferring warm air directly exiting a radiator and having a temperature of from about 120° F. to about 200° F. to an air intake of an engine using a variable vane which flexes and rebounds to continuously adjust an amount of warm air being supplied to said air intake;

allowing said variable vane to flex and rotate an air deflection surface of said variable vane to a position which supplies an increased volume of warm air to said air intake as a warm air load against said air deflection surface is increased; and allowing said variable vane to rebound and rotate said air deflection surface to a position which supplies a decreased volume of warm air to said air intake as a warm air load against said air deflection surface of said variable vane is decreased.

2. A method according to claim 1, further comprising the step of providing said warm air load by at least one of warm air traveling through said radiator while operating said vehicle or forcing warm air against said warm air deflection surface using a fan.

3. A method according to claim 1, further comprising the step of passing said warm air through a warm air conduit and then into said air intake.

4. A method according to claim 1, wherein said allowing steps further comprise utilizing a variable vane material which to provides enhanced flex as the ambient air temperature is raised such that said air deflection surface is flexed and rotated to a position which supplies an increased volume of warm air to said air intake as the ambient air temperature is raised.

5. A method according to claim 4, wherein said variable vane material is plastic.

6. A method according to claim 1, wherein said engine is a diesel engine.

7. A method according to claim 6, further comprising the step of passing said warm air into a warm air opening in said air intake such that a cross-sectional area of the warm air opening is 10 to 30% the cross-sectional area of said air intake.

8. A method according to claim 1, wherein said engine is a gasoline engine.

9. A method according to claim 8, further comprising the step of passing said warm air into a warm air opening in said air intake tube such that said warm air opening has a cross-sectional area of 10 to 30% the cross-sectional area of the air intake tube.

10. A warm air intake system according to claim 1, wherein said variable vane includes at least one warm air guide.

11. A warm air intake system for a vehicle comprising a radiator cooling system and an engine having an air intake, said warm air intake system comprising:

a variable vane having a warm air deflection surface, a flexible material for adjusting the position of said warm air deflection surface in response to a warm air load contacting said warm air deflection surface, and a mount for mounting said variable vane, said flexible material binding said warm air deflection surface to said mount, said variable vane providing a predetermined degree of rotation of said warm air deflection surface in response to a warm air load applied to said warm air deflection surface.

12. A warm air intake system according to claim 11, further comprising a warm air conduit for transferring warm air from said variable vane to said air intake system.

13. A warm air intake system according to claim 11, wherein said warm air deflection surface, said flexible material and said mount are integrally formed.

14. A warm air intake system according to claim 13, wherein said warm air deflection surface, said flexible material and said mount are integrally formed as a solid plastic variable vane.

15. A warm air intake system according to claim 14, wherein said plastic variable vane is formed from a resin comprising polycarbonate resin or acrylic resin.

16. A warm air intake system on a bus comprising a diesel engine, an air intake for the diesel engine, and a radiator for cooling the diesel engine, said warm air intake system comprising:

a variable vane having a warm air deflection surface, a flexible material for adjusting the position of said warm air deflection surface in response to a warm air load contacting said warm air deflection surface, and a mount for mounting said variable vane, said flexible material binding said warm air deflection surface to said mount, said variable vane providing a predetermined degree of rotation of said warm air deflection surface in response to a warm air load applied to said warm air deflection surface;

said variable vane being mounted in a position such that warm air flowing directly through said radiator contacts said warm air deflection surface to provide a warm air load against said warm air deflection surface; and a warm air conduit constructed and arranged for transferring warm air from said variable vane to said air intake of said diesel engine.

17. A warm air intake system according to claim 16, wherein said warm air deflection surface, said flexible material and said mount are integrally formed.

18. A warm air intake system according to claim 17, wherein said warm air deflection surface, said flexible material and said mount are integrally formed as a solid plastic variable vane.

19. A warm air intake system according to claim 18, wherein said plastic variable vane is formed from a resin comprising polycarbonate resin or acrylic resin.

20. A warm air intake system according to claim 16, wherein said variable vane further includes warm air guides constructed and arranged to direct warm air in a desired direction along a deflection surface of said variable vane.

* * * * *